United States Patent
Brough et al.

(10) Patent No.: US 7,950,591 B2
(45) Date of Patent: May 31, 2011

(54) COMPOSITE LOAD BEARING STRUCTURE

(75) Inventors: Chris Brough, Temple, TX (US); Ryan Nielson, Temple, TX (US); Gershon Yaniv, Georgetown, TX (US)

(73) Assignee: Integrico Composites, LLC, Temple, TX (US)

( * ) Notice: Subject to any disclaimer, the term of this patent is extended or adjusted under 35 U.S.C. 154(b) by 0 days.

(21) Appl. No.: 12/633,369

(22) Filed: Dec. 8, 2009

(65) Prior Publication Data

US 2010/0084787 A1 Apr. 8, 2010

Related U.S. Application Data

(62) Division of application No. 11/669,262, filed on Jan. 31, 2007.

(51) Int. Cl.
*E01B 9/14* (2006.01)

(52) U.S. Cl. ............................. 238/83; 238/84

(58) Field of Classification Search ................ 238/29, 238/83, 84, 85, 88, 95, 98, 99, 100, 101, 238/102, 117
See application file for complete search history.

(56) References Cited

U.S. PATENT DOCUMENTS

| | | | | |
|---|---|---|---|---|
| 4,286,753 | A * | 9/1981 | Lee | 238/37 |
| 4,824,627 | A * | 4/1989 | Hammer et al. | 264/211.21 |
| 5,609,295 | A * | 3/1997 | Richards | 238/84 |
| 5,722,589 | A * | 3/1998 | Richards | 238/84 |
| 5,886,078 | A * | 3/1999 | Sullivan et al. | 524/449 |
| 6,179,215 | B1 * | 1/2001 | Shea | 238/29 |
| 6,231,994 | B1 * | 5/2001 | Totten | 428/537.1 |
| 6,247,651 | B1 * | 6/2001 | Marinelli | 238/84 |
| 6,336,265 | B1 * | 1/2002 | Niedermair | 29/460 |
| 6,659,362 | B1 * | 12/2003 | Hallissy et al. | 238/83 |
| 6,766,963 | B2 * | 7/2004 | Hansen | 238/84 |
| 7,175,905 | B2 * | 2/2007 | Curtis et al. | 428/338 |
| 2010/0084787 | A1 * | 4/2010 | Brough et al. | 264/277 |

* cited by examiner

*Primary Examiner* — S. Joseph Morano
*Assistant Examiner* — Jason C Smith
(74) *Attorney, Agent, or Firm* — Tompkins P.C.; George M. Tompkins

(57) ABSTRACT

A composite load bearing member is provided comprising an elongated inner structural member and a thick polymeric composite outer member. An apparatus for producing the composite load bearing member is provided including devices for suspending the inner structural member within a mold cavity prior to and during injection of the polymeric composite outer member. A method of using the apparatus to produce the composite load bearing member is provided.

11 Claims, 4 Drawing Sheets

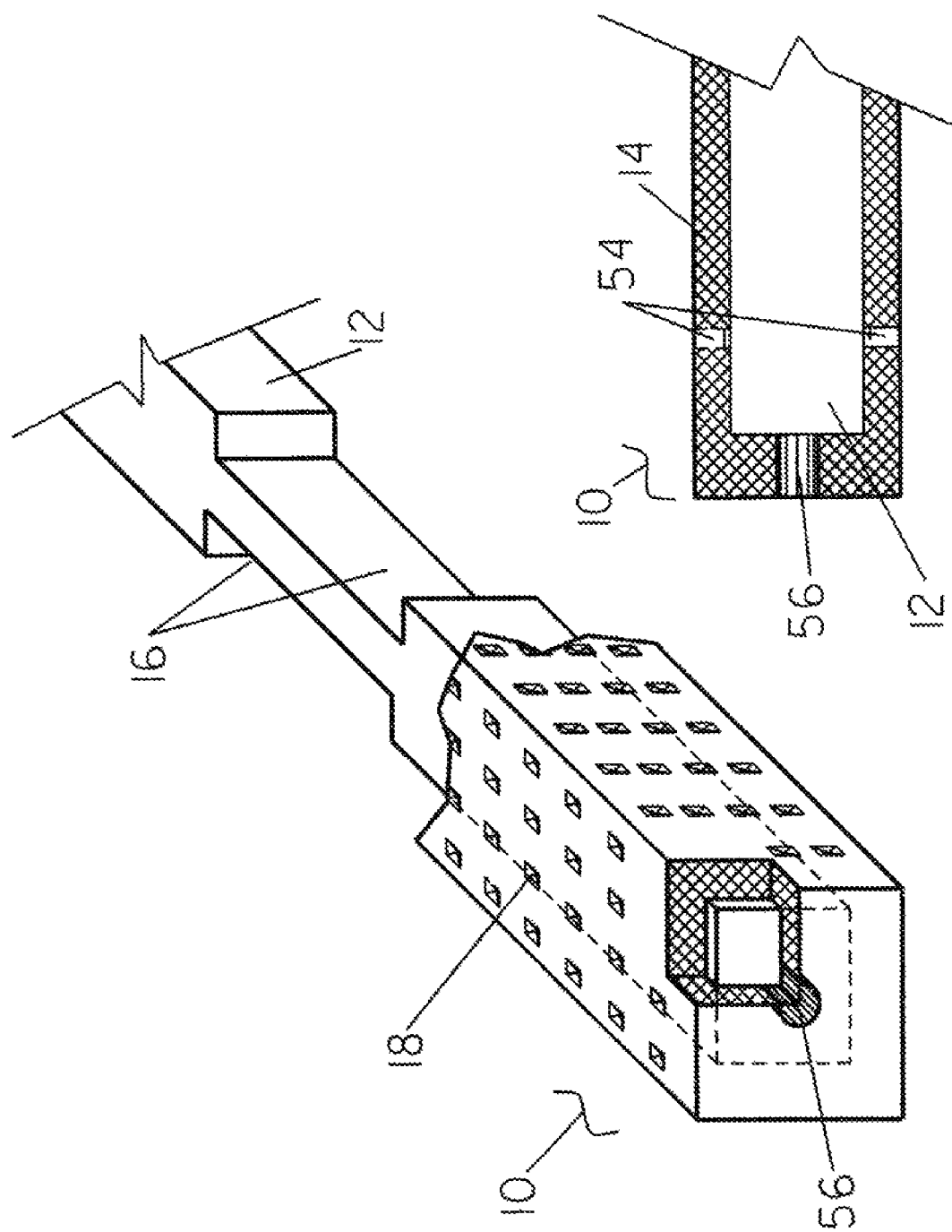

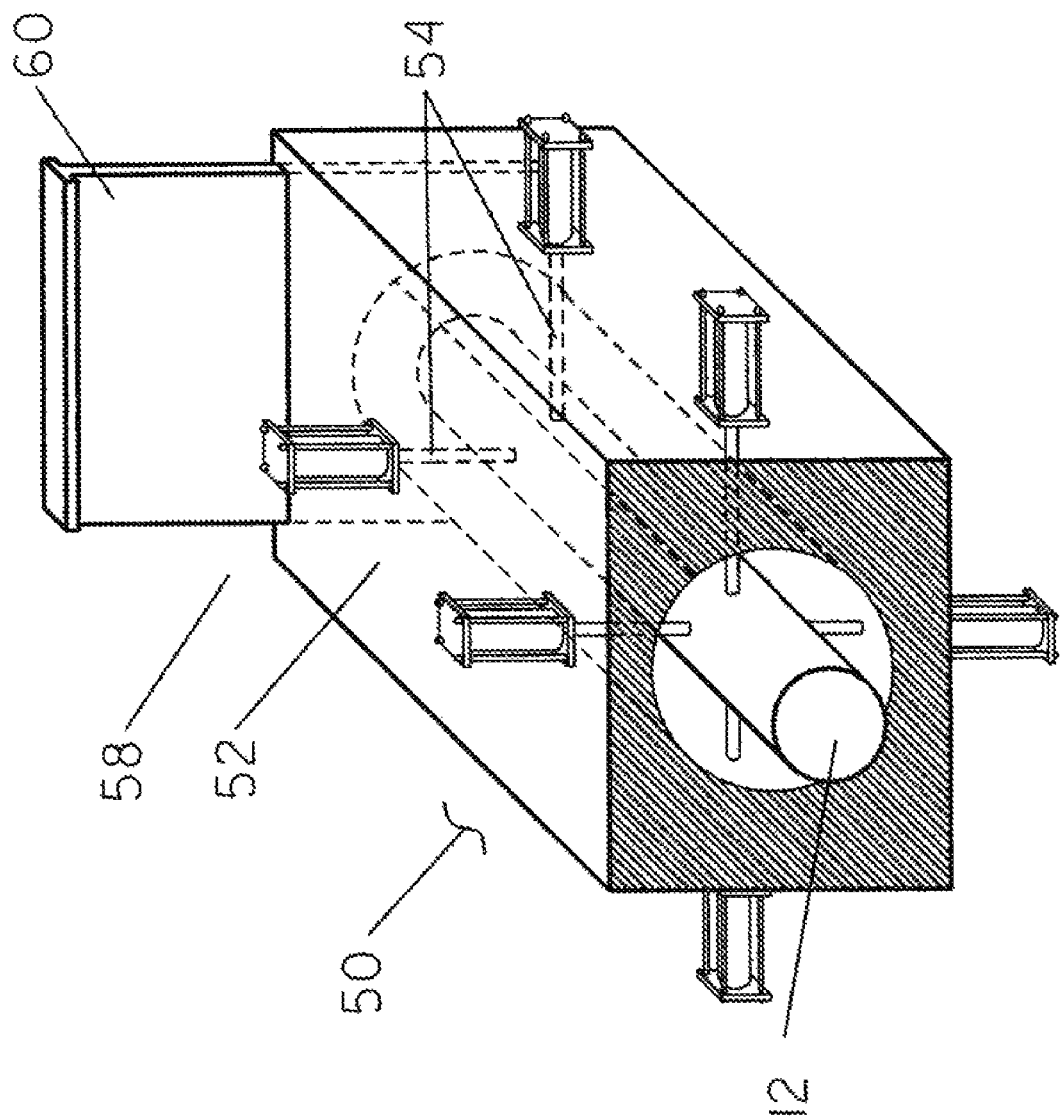

COMPOSITE LOAD BEARING STRUCTURE

CROSS REFERENCE TO RELATED APPLICATIONS

This application is a divisional of application Ser. No. 11/669,262, filed Jan. 31, 2007, and entitled Composite Load Bearing Structure; this application claims priority to that application which is also incorporated herein by reference.

TECHNICAL FIELD OF THE INVENTION

The present invention is generally directed toward composite load bearing structures and an apparatus and process for manufacturing composite load bearing structures. In particular, the present invention is directed toward a composite load bearing structure having an inner strengthening member. Most specifically, the present invention is directed toward a durable, long-lasting, economic alternative to traditional load bearing structures.

BACKGROUND ART OF THE INVENTION

The selection and use of materials and configurations in load bearing structures has become increasingly challenging in recent times due in part to advances in technology and the continuous development of new and better materials. Correspondingly, considerations and expectations involved in such a selection has grown as well, including such traditional considerations as strength and stiffness, but also including demands for more durable, long-lasting, economic and environmentally friendly materials as well. Despite these more recent demands, traditional structural members are still predominant in many current industrial sectors for various reasons, including the fact that the current state of the art has not been able to provide a product that adequately meets these existing demands.

For instance, in the railroad industry, modern railroad ties (also known as cross ties or sleepers) are load bearing structural members used as a base for railroad tracks, providing lateral support and stability for the rails; however, despite decades of technological advancement, railroad ties are still typically made of wood. In fact, in 2006 approximately 18.4 million railroad ties were replaced in the United States alone. Of these, 91.1% were wood, 7.7% were concrete, 0.8% were composite, and 0.4% were steel. This current trend of maintaining railroad ties made of wood is predominantly due to the traditional advantages of the use of wood railroad ties over other types of available railroad ties.

The advantages of continuing to use conventional railroad ties in the United States railroad industry mainly revolve around their consistent and well-known performance characteristics as well as the fact that they are relatively inexpensive to purchase and initially install. Clearly the performance characteristics of modern, wood railroad ties are well-known due to their extensive use throughout the industry dating back to the early years of the railroad industry itself. That is, not only is the life of the wood tie relatively straight-forward to predict, but the strength and stiffness of replacement ties roughly correspond to those of existing wood ties that may be closely situated but not yet needing replacement. This, in turn, allows replacement of only those ties that need to be replaced rather than having to replace an entire section of track ties merely because the performance characteristics of replacement ties is substantially different than those of existing ties. Moreover, the initial purchase and installation of wood ties are relatively inexpensive, not only because of the cost of the wood itself, but also because of the ready availability of the ties and the existing means for their installation.

However, the use of conventional wood railroad ties have a number of disadvantages associated therewith as well. First and foremost, despite their predictability, wood ties must be replaced every few years making such use somewhat expensive over a long period of time. Furthermore, wood's natural susceptibility to certain environmental conditions results in a much greater replacement frequency in some areas compared to others. For example, in a mild, relatively dry climate, a wood railroad tie typically needs replacement every fifteen years; however, in warm, wet areas (particularly those native to wood destroying pests, such as termites) a wood railroad tie might need replacement as frequently as every five years. Thus, one can easily see the long-term economic need for a railroad tie comprised of longer lasting more durable materials.

In an attempt to combat the harsh effects of the environment and, in particular, wood destroying insects, wood ties are typically treated with preservatives. However, the typical preservatives currently used to treat wood ties are either prone to leaching and dissipating from the wood into the surrounding environment and/or are hazardous in nature. For instance, borate products are known for their ability to preserve wood when used as a fungicide and pesticide; however, it is also well known that the borate treatments tend to leach out of treated wood very quickly, particularly along crevices or checks in the surface of the wood itself. In addition, creosote is currently used as a surface treatment to wood railroad ties and utility poles to preserve the wood and prevent deterioration due to insects; however, creosote is a known carcinogen, harmful to humans and animals. In fact, the Environmental Protection Agency considered banning creosote in 1987, but the agency allowed its continued use because of the lack of suitable alternatives. Additionally, a number of lawsuits have been filed in recent years relating to the detrimental effects of creosote usage. Therefore, it is clearly undesirable not only to manufacture such railroad ties, but also to have such railroad ties in use and finally, to dispose of such ties as well.

In an effort to provide a railroad tie with increased longevity, railroad ties of varying material composition have developed over the years; however, none of them have had great success in replacing wood ties because of the various drawbacks associated with their respective use. Steel ties, for instance, have realized only limited use due to a number of factors. First, although steel is a strong, stiff material (with similar properties to wood), steel's susceptibility to rusting makes it an unattractive alternative. Additionally, the use of steel ties is also associated with a high noise level during use. Moreover, since the current method of locating the positions of trains throughout a particular railway system is by utilizing the steel rails for transmitting an electrical signal, the steel rails must be electrically isolated from one another, clearly precluding the use of steel ties between the rails. Finally, the use of steel ties also does not facilitate the typical system of attaching rails to ties through the use of railroad tie spikes. Therefore, steel railroad ties have emerged as an unattractive option to traditional wood ties.

Another option to wood railroad ties that has emerged over the years is railroad ties comprised substantially of concrete. Again, although concrete potentially extends the duration of ties, it also has a number of disadvantages associated therewith. Concrete ties are significantly more expensive than wood ties. This is true, not only in the original purchasing phase, but also in the installation phase. That is, since concrete is significantly heavier than wood, such ties are not able to be handled, transported, or installed using existing processes and equipment. Furthermore, the use of concrete ties requires much more complex rail fastening systems, again increasing the cost of installation. In addition, because of the nature of the repeated compressive and tensile loading a railroad tie experiences, steel reinforcement bars are typically needed. The use of such reinforcement potentially short-circuiting the aforementioned train locating system as well. Finally, the performance characteristics of concrete (particularly hardness and stiffness) are significantly different than those of wood. Because of this difference, when concrete ties are mixed into sections with existing wood ties, uneven loading occurs, resulting in significantly shorter lifespan of the surrounding wood ties. For this reason, entire sections of railroad ties must be replaced when replacing with concrete ties, again resulting in much higher installation costs. Thus, concrete ties are also considered an unattractive alternative to wood railroad ties.

From this background a number of composite railroad ties have emerged in an effort to obtain a longer lasting alternative to a wood tie that maintains the beneficial performance characteristics of a wood tie. Two competing challenges exist in the development and production of composite railroad ties: product performance and economics. That is, virgin resin material could be used to provide the desired performance characteristics; however, the final product would be many times the cost of a wood tie. In contrast, pure recycled polymers could be used to reduce the cost of the tie, but the material properties of such a railroad tie would not be acceptable. Therefore, the typical composite tie composition that has developed to best achieve both parameters is through the use of a material combination of recycled plastic and a mineral additive. However, although the desired properties with such a composition may be obtained, it is difficult to maintain such requirements throughout extensive production runs. High quality, durable recycled plastics are necessary to achieve sufficient strength. Moreover, manufacturing such composite ties consumes tremendous volumes of recycled plastic requiring the maintenance of multiple sources. However, even slight variation in the quality of the recycled plastics not only has an impact on the properties of the polymer, but it also impacts the interaction between the polymers and the mineral additives. All of this leading to railroad ties that may last five times longer than wood railroad ties but that are still unacceptable because of they lack the consistent strength and stiffness properties of wood ties.

Other approaches have been taken for providing composite load bearing members as well including those disclosed in U.S. Pat. Nos. 6,766,963, 6,659,362, 6,336,265, 6,247,651, 6,179,215, 5,886,078, 5,722,589, 5,609,295, 4,286,753, While all disclose a novel approach in solving the problem, each has its own respective disadvantages as well. For instance, U.S. Pat. No. 6,336,265 issued to Neidermair discloses a railroad tie comprised of a slightly undersized wood railroad tie with an end cap attached to each end and coated in a thin plastic film in an effort to retain the performance characteristics of the wood tie, while extending its life through surface protection. However, Neidermair has disadvantages in at least three areas. First, the method of producing the composite tie in Neidermair is a complicated and potentially expensive one, involving the removal of all treated surfaces from an existing wood railroad tie, machining the ends to fit the end caps, and feeding the complete assembly through an extrusion process. Additionally, the plastic coating applied to Neidermair is relatively thin and potentially easily penetrated through typical use and environmental conditions allowing a path for moisture or insects to the untreated wood inside. Finally, the use of a traditional railroad spike is either precluded, or if used, provides an additional path for moisture or insects to the untreated wood tie inside.

Additionally, an attempt at a reinforced composite load bearing structure is disclosed in U.S. Pat. Nos. 5,609,295 and 5,722,589 issued to Richards. The Richards patents disclose a composite member comprising a binding constituent and an aggregate material potentially including an inner strengthening member. However, the Richards patents also have a number of drawbacks associated therewith, particularly when used as a railroad tie. First, the fact that the member is composed mainly of aggregate material leads to both weight and performance characteristics more similar to those associated with existing concrete ties as opposed to existing wood ties. That is, the weight of such a tie precludes traditional transportation and installation methods as used on wood ties, and the increased density of such a tie precludes its use alongside existing wood ties because it would lead an uneven loading condition, as previously described. Finally, existing rail connecting methods could not be used with such a tie either; rather, a more complex system of inserts and/or bolting methods must be used, as described in the Richards patents.

In addition to the foregoing, another significant example of the long felt need for an economical solution to traditional load bearing members is in the marine timber or marine pile industry. Marine timbers are load bearing members that provide columnar support for marine piers and other marine structures. As in the railroad industry, traditional chemically treated wooden marine timbers are still the norm in the industry despite the technological advancements made in composite and other materials. Similarly to traditional railroad ties, wooden marine timbers suffer from a number of drawbacks, in particular the frequent need for replacement due to the wear and tear of harsh environmental conditions. Attempts have been made in the industry to produce longer lasting composite marine timbers through the use of recycled plastics reinforced by fiberglass rebar; however, although these timbers may provide longer life than traditional chemically treated wooden timber, they are significantly more expensive to produce and further dependent on a consistent flow of high quality virgin or recycled polymers. Hence the long-term, economic feasibility of such members is far from sound.

In view of the limitations associated with the prior art, a substantial need exists for a composite load bearing member that has similar properties to that of a traditional wood load bearing member, has a much longer life than that of a traditional wood load bearing member, and is relatively inexpensive to manufacture. Applicant's invention, through a novel combination of component materials and configurations, provides such a load bearing structure.

SUMMARY OF THE INVENTION

The general purpose of the present invention, which will be described subsequently in greater detail, is to provide a composite load bearing member, which contains many of the advantages of the prior art along with significant novel features that result in a composite load bearing member that is not anticipated, rendered obvious, suggested, or even implied by any of the known devices, either alone or in combination.

In view of the foregoing, it is an object of the present invention to provide a composite load bearing member that is less expensive than traditional composite members.

It is another object of the present invention to provide a composite load bearing member with similar performance characteristics to that of traditional wood members.

It is another object of the present invention to provide a composite load bearing member similar in weight to traditional wood members.

It is another object of the present invention to provide a composite load bearing member that is extremely resistant to harsh environmental conditions.

It is another object of the present invention to provide a composite load bearing member that is not harmful to the environment.

It is another object of the present invention to provide a composite load bearing member that is durable and long-lasting.

It is another object of the present invention to provide a composite load bearing member that may be used with existing transportation and installation methods.

It is another object of the present invention to provide a method of manufacturing a composite load bearing member that is efficient and inexpensive.

In satisfaction of these and other related objectives, the present invention provides a composite load bearing member with an internal reinforcement member. As will be discussed in the specification to follow, practice of the present invention provides an inexpensive, durable, long-lasting structural member allowing side by side replacement along traditional wood members.

The preferred embodiment of the present invention incorporates an internal structure into a composite load bearing member both to provide stiffness and to displace composite material. The internal structures are preferably comprised of chemically treated wood structural members selected from a variety of structural shapes including the traditional rectangular shape. This internal structural member is completely embedded within and bonded to a substantial amount of composite material, most preferably comprised of post consumer or post industrial recycled polymers, preferably having a small amount of mineral additive. In production, the internal structural member is placed within a mold in suspended fashion. That is, the internal structure should be spaced apart from all sides of the mold. The present invention, preferably, provides for a plurality of spacing mechanisms attached to the internal member along all sides of the internal member, except for the side facing a gate wherein the polymer is introduced. Most preferably, the spacing mechanisms are composed of a material similar to that of the polymeric composite that is to be used. Next, the polymeric composite is prepared accordingly and forced through a gate into the mold completely encapsulating and bonding with the internal member. The gate is closed, and the composite member is allowed to cool and is ejected from the mold. Thus, in the case of a railroad tie or marine timber, the present invention provides a composite railroad tie having the strength and stiffness of a traditional wood member in a package that is much more durable and environmentally resistant than a traditional wood member.

The present invention provides many advantages over traditional support members, particularly railroad ties and marine timbers, as well as prior art composite load bearing members. Importantly, the present invention can be engineered to provide performance characteristics on par with those of traditional wood members. That is, the strength and stiffness characteristics of wood railroad ties or marine timbers may be easily replicated through the joint action of the internal structural member and the polymeric composite outer member. Thus, the present invention provides a structural member that may be placed in close proximity to traditional wood members, while maintaining substantially equivalent loading on each, a requirement of which concrete, steel, and aggregate members are incapable. At the same time, the overall density of the member of the present invention can be engineered to be much more similar to that of a solid wood member than that of the prior art. Therefore, the present invention provides a structural member similar in weight and performance characteristics to traditional wood members so as to be handled, transported, and installed using existing or traditional methods, including providing the capability of being lifted and maneuvered manually by two people, another requirement that steel, concrete, and aggregate members are not capable of fulfilling.

Moreover, the present invention provides a composite member for use as a railroad tie allowing the traditional method of attaching a rail thereto. Rails have long been attached to traditional wood railroad ties by embedding spikes into the railroad tie itself. The head of the spike has an elongated edge that overlaps a lower portion of a rail, entrapping the rail against the tie as the spike is driven into the tie. Embodiments of the present invention allow for such a railroad spike to be driven deeply into the composite member, potentially embedding into the inner structural member itself. Optionally, voids may be intentionally placed in the inner member where railroad spikes are intended to be driven such that a railroad spike does not penetrate the internal structure but remains embedded into the polymeric composite portion of the load bearing member. Thus, in contrast to steel, concrete, or aggregate based members, the present invention allows use of traditional methods of rail attachment.

In addition to incorporating the advantages of traditional wood structural members, the present invention also provides advantages over wood members as well. First, the thick polymeric composite fully encapsulates the inner member leaving no path for moisture or other environmental effects, providing protection from harsh environmental conditions, normally destructive to wood. Secondly, although some wood boring pests have been known to bore through thin sheets of polymer, the thickness of the polymeric composite used in the present invention provides excellent protection from such pests as well. Finally, as a back up to the protection provided by the polymeric composite, the internal structural member of the present invention is treated with a chemical agent as well, preferably one not damaging to the environment such as borate. Furthermore, although borate based products are difficult to use in traditional wood members that are not externally protected due to its tendency to dissipate its surrounding environment, such a treatment is possible with the present invention because the treated member is sealed from the environment by the thick layer of polymeric composite. Therefore, even if a small leak path to the inner member is introduced, such as through spiking into the inner member in attaching the rail, in the case of a railroad tie, the present invention provides an additional layer of environmental protection, resulting in a more durable, long-lasting product than that of the traditional wood tie.

Finally, embodiments of the present invention provide significant improvements over the prior art composite load bearing members, such as composite railroad ties, marine timbers, or the like. In contrast to any of the prior art composite structural members, the present invention provides an inner member that not only provides structural integrity and stiffness to the structure, but also displaces a significant amount of polymeric material. This has the dual effect of balancing the aforementioned competing challenges of product performance and economic efficiency by taking advantage of the attributes of both the inexpensive wooden core and the durable polymeric composite providing protection. Thus, embodiments of the present invention provide a structural load bearing member, such as a railroad tie, marine timber or the like, having the performance advantages of solid wood combined with the durability advantages of prior art composite structures, with significantly less expense than that associated with prior art composite structures.

BRIEF DESCRIPTION OF THE DRAWINGS

Applicant's invention may be further understood from a description of the accompanying drawings, wherein unless otherwise specified, like referenced numerals are intended to depict like components in the various views.

FIG. 2a is a perspective view of an embodiment of the present invention.

FIG. 2b is a partial side cross-sectional view of an embodiment of the present invention.

FIG. 4 is a depiction of another embodiment of an apparatus for producing composite structural members of the present invention.

DETAILED DESCRIPTION OF THE PREFERRED EMBODIMENT

Referring to FIGS. 1a-1f, a composite structural member is shown and generally designated by numeral 10. Composite member (10) contains inner structural member (12). In the preferred embodiment, inner member (12) is comprised of solid wood sections. Inner member (12) may be comprised of other materials such as steel, fiberglass composites, laminated or engineered wood sections, foamed, honey-combed or reinforced polymeric structures, or other structural materials as known in the art as well; however, it is contemplated that inner structural member (12) should have structural and economic characteristics similar to wood for maximum efficiency of the present invention. Additionally, inner member (12) may be chemically treated with pesticides and/or preservatives for maximum protection from environmental hazards and wood destroying pests. Preferably, inner member (12) is to be pretreated with an environmentally friendly chemical such as a borate based product as currently known in the art of pesticide treatment of wooden articles of construction.

Figure 1A:
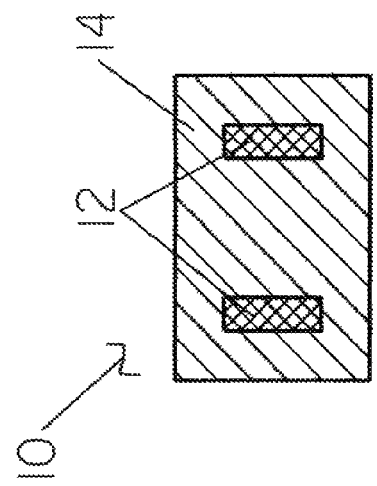
FIG. 1a is a cross-sectional view of an embodiment of the present invention.
Figure 1B:
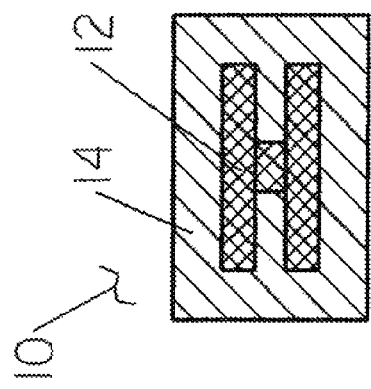
FIG. 1b is a cross-sectional view of another embodiment of the present invention.
Figure 1C:
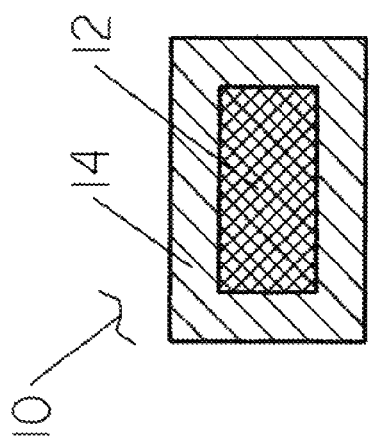
FIG. 1c is a cross-sectional view of another embodiment of the present invention.
Figure 1D:
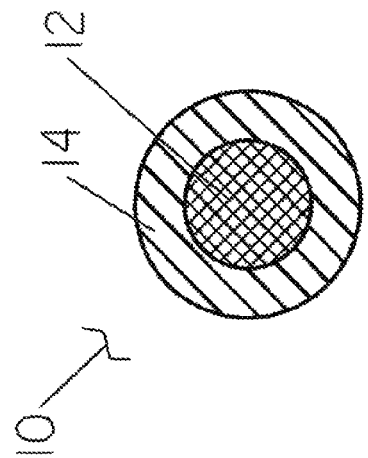
FIG. 1d is a cross-sectional view of another embodiment of the present invention.
Figure 1E:
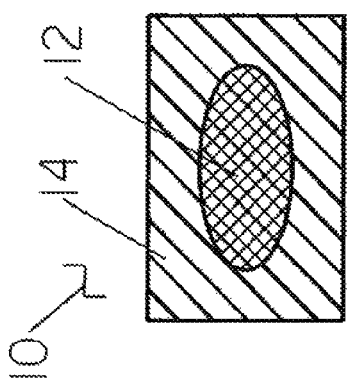
FIG. 1e is a cross-sectional view of another embodiment of the present invention.
Figure 1F:
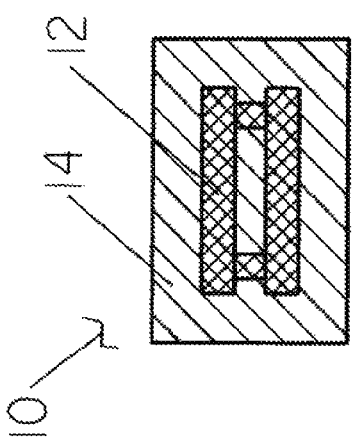
FIG. 1f is a cross-sectional view of another embodiment of the present invention.

Furthermore, inner member (12) may take the form of any of a number of known structural cross-sectional shapes, a few of which are depicted in FIGS. 1a-1f. Each of these figures, although not intended to be drawn to scale, is intended to depict the representative shape and size of a standard railroad tie, in which the outer dimensions are typically seven inches high by nine inches wide. In the preferred embodiment, inner structural member (12), regardless of the exact configuration, should be of the approximate, respective dimensions of four inches high and six inches wide. For example, FIG. 1a depicts a cross-section of the present invention wherein the outer envelope is seven inches high and nine inches wide and inner structural member (12) is a solid rectangular cross-section that is four inches high and six inches wide. Additionally, FIG. 1f depicts a cylindrical member as typically used in the marine pile industry. FIGS. 1a-1f are only a sampling of the potential structural shapes that inner member (12) and composite member (10) may generally take in the present invention, and such figures are meant as exemplary and not limiting.

Still referring to FIGS. 1a-1f, the remainder of member (10) is comprised of composite (14). Composite (14) is preferably a polymeric composite comprised of post consumer and/or post industrial recycled polymer mixed with or without a non-polymeric additive, such as mica, gypsum, talc, and/or various rubber materials. Composite (14) encapsulates and adheres to inner member (12) providing a thick layer of leak and insect proof protection of inner member (12). In the present invention, composite (14) comprises 20-95% by volume of member (10), preferably 60% by volume. This amount of composite (14) is considered optimum because it provides a significant thickness of composite material on each side of inner member (12) for the dual purpose of maximum protection of inner member (12) and maximum durability and longevity of structural member (10). This, in turn, provides a member (10) with the beneficial characteristics of a polymeric composite load bearing member along with the performance characteristics of a wood member in a package that is much more economical to produce than prior art composite members.

Referring to FIG. 2a, an embodiment of member (10) is shown with a cut-away section allowing a partial perspective view of inner member (12). In this embodiment, as previously referenced, inner member (12) is shown with strategically placed voids (16). Voids (16) are configured such that when railroad spikes are used to attach a rail to member (10), the spikes will embed into composite (14) and not penetrate into inner member (12). Thus, since inner member (12) is never penetrated in this embodiment of the present invention, inner member (12) remains completely sealed by composite (14), leaving no potential for penetration by moisture or wood destroying pests.

Still referring to FIG. 2a, a perspective view of a partial embodiment of composite load bearing member (10) is shown with texture (18) applied to the exterior surfaces of member (10). In the railroad industry, railroad ties are placed into gravel for stability and support. When member (10) is used as a railroad tie, texture (18) provides a surface that will grip and settle into the gravel bed more securely than that of a smooth surface. Texture (18) can be arranged in any number of patterns; however, a pattern of tightly spaced small pyramidal indentions has been found to be extremely beneficial.

Referring to FIG. 2b, a partial side cross-sectional view of the composite load bearing member is depicted. The embodiment of the present invention depicted in FIG. 2b includes an embodiment of suspension members (54) and block member (56), which are subsequently described in greater detail.

Figure 3:
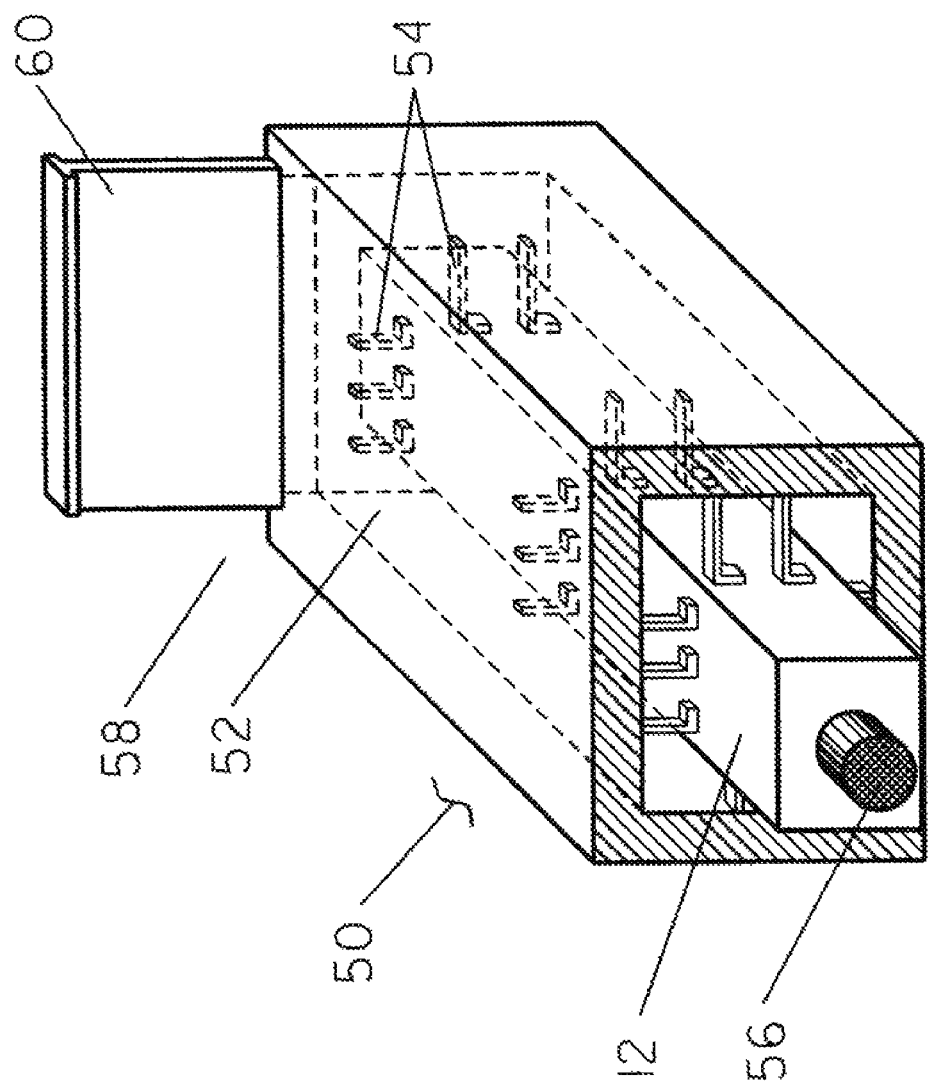
FIG. 3 is a depiction of an apparatus for producing composite structural members of the present invention.

Now referring to FIG. 3, a novel apparatus and process for manufacturing the above described load bearing structure is depicted and generally referred to by the numeral 50. Mold member (52) is depicted with a cut-away section allowing a partial perspective view of inner member (12). Mold member (52) is shown in the general dimensions of a rectangular structural member, such as that of a traditional railroad tie; however, a number of variations and shapes may be accomplished and are contemplated by the present invention, including, but not limited to a cylindrical member such as that of a marine timber or fence post. Additionally, an embodiment of inner member (12) is depicted suspended in mold member (52) by a plurality of suspension members (54). A variety of suspension members (54) are contemplated by the present invention; however, three embodiments are seen to be most beneficial. The first embodiment of suspension member (54) is in the form of any of a number of shapes, such as an angle or "T" member, which is attached to inner member (12) extending therefrom to contact the inner surface of mold member (52). Furthermore, this embodiment of suspension members (54) is comprised of a material similar to that used in composite (14). Thus, in this embodiment of suspension members (54), the surface of members (54) may soften and bond with composite (14) during molding. Regardless of whether a chemical bonding takes place, a physical engagement between suspension members (54) and composite (14) takes place as the materials cool and composite (14) shrinks about suspension members (54). Additionally, when texture (18) is hot stamped onto the surface of member (10), composite (14) and suspension members (54) are again partially melted and their respective materials are displaced at the surface of member (10), resulting in composite (14) filling in any gaps on the surface of member (10) that may have resulted from the lack of complete chemical and/or physical bonding of composite (14) and suspension members (54). As seen in FIG. 4, another embodiment of suspension members (54) comprise metal pin members extending from the inner surface of mold member (52) in a plurality of locations throughout mold member (52). It this embodiment, after composite (14) is injected into mold member (52) and has begun to solidify, suspension members (54) are retracted allowing the partially fluid composite (14) to fill in the voids left where suspension members (54) were located. This embodiment is most preferably automated by electrically or hydraulically controlled suspension members (54). Alternatively, suspension members (54) may be screws, bolts, or the like that are attached to inner member (12). In this embodiment, once member (10) has sufficiently cooled, suspension members (54) may then be removed, and the remaining voids may be filled with an epoxy or other sealant to achieve complete sealing of inner member (12).

Finally, an embodiment of the present invention includes block member (56) located between inner member (12) and mold member (52) at the end opposite gate end (58). Block member (56) may also be comprised of the same or similar material as that of composite (14). Block member (56) supports inner member (12), resisting the forces exerted onto inner member (12) by composite (14) during the injecting process. Block member (56) may also be configured in a grooved or stepped fashion such that when molten composite (14) flows completely around inner member (12), composite (14) will surround and form a physical and/or chemical bond with block member (56), resulting in near complete sealing of inner member (12) in composite (14). Again, in the instance that complete bond and sealing do not take place between composite (14) and block (56), the heat stamping process of placing texture (18) onto the surface of member (10) results in displacement of both composite (14) and block member (56) resulting in complete sealing of inner member (12) from the external environment.

Furthermore, alternative embodiments of block member (56) exist as well and are contemplated by the current invention. That is, block member (56) may be a significantly thinner member than previously described and made of any of a number of materials, including metallic or composite materials. This embodiment may be used in conjunction with suspension members (54) of the second or third type as previously described, wherein suspension members (54) are configured to engage with block member (56), which resists the forces generated during the process of injecting composite (14), and provides for the prevention of suspension members (54) from embedding into inner member (12). Suspension members (54) may then either be retracted (if of the second embodiment type previously described) while composite (14) is cooling to allow composite (14) to fill in the voids left by suspension members (54). Alternatively, suspension member (54) may be removed after cooling of member (10), wherein a sealant may be used to fill the remaining voids, sealing inner member (12) from the external environment.

In practice, the process of manufacturing the present invention is generally as follows. First, inner member (12) is suspended in mold member (52) in one of the methods as previously described. Next, composite (14) is prepared for injection in any number of methods as generally known in the art. Composite (14) is then injected through gate end (58) of mold member (52) flowing along inner member (12) until mold member (52) is completely filled and inner member (12) is completely surrounded with composite (14). Following this, gate member (60) is closed and member (10) is allowed to cool. As previously described, at some point in the cooling process, if the second embodiment of suspension members (54) is utilized, suspension members (54) must be retracted to allow closure of the voids. Otherwise, if the first embodiment of suspension members (54) is utilized, composite (14) shrinks as it cools and mechanically engages with suspension member (54) to substantially seal off inner member (12) from the external environment. Additionally, as previously described, block member (56) also bonds with composite (14) and seals inner member (12) from the external environment as well. Once member (10) has cooled, member (10) is removed from mold member (52), and texture (18) is hot stamped onto the surface of member (10). As previously mentioned, this step displaces material on the surface of member (10), resulting in the surface of composite (14) being displaced filling any gaps that may exist between suspension members (54) and composite (14). Alternatively, texture (18) may be applied during the molding process itself by texturing the surface of the mold. The result being a composite load bearing structure (10) having the strength and stiffness similar to that of a traditional wood member with the durability, longevity, environment resistance and pest resistance of a composite member produced at a much lower cost than that of traditional composite structures.

Although the invention has been described with reference to specific embodiments, this description is not meant to be construed in a limited sense. Various modifications of the disclosed embodiments, as well as alternative embodiments of the inventions will become apparent to persons skilled in the art upon reference to the description of the invention. It is, therefore, contemplated that the appended claims will cover such modifications that fall within the scope of the invention.

We claim:

1. An apparatus for manufacturing a composite load bearing member, comprising: a mold member having a longitudinal cavity with a proximal end, a distal end, and a mold wall extending between the proximal and distal ends, wherein an elongate inner structural member is located internally to said mold member; a plurality of suspension members, wherein said plurality of suspension members position the inner structural member at a predetermined distance from said mold wall; a block member, said block member positioned between a distal end of said elongate inner structural member and said distal end of said mold member; an opening defined in said proximal end of said longitudinal cavity through which a polymeric material may be forced to encapsulate said elongate inner structural member; and a gate attached to the mold member and configured to selectively close said opening.

2. The apparatus of claim 1 wherein said elongate inner structural member is located a specified distance from said distal end of said longitudinal cavity by said block member.

3. The apparatus of claim 1 wherein said plurality of suspension members comprise a polymeric material, said plurality of suspension members being attached to said inner structural member.

4. The apparatus of claim 1 wherein said plurality of suspension members comprise a plurality of retractable pin members extending into said cavity of said mold member wherein said plurality of retractable pin members may be retracted.

5. The apparatus of claim 1 wherein said plurality of suspension members are reversibly attached to said inner structural member and removable after solidification of said polymeric material.

6. A method of producing a composite load bearing member, comprising: selecting an elongate inner structural member having a proximal and distal end; placing said elongate inner structural member into a mold member having a cavity with a proximal end, a distal end, and a mold wall extending between the proximal and distal ends; positioning said elongate structural member at a predetermined distance from said mold wall using suspension members; positioning said elongate structural member at a predetermined distance from said mold cavity distal end using a block member; preparing a polymeric mixture; forcing said polymeric mixture through a closable gate member attached to said proximal end of said cavity; closing said gate member; allowing said polymeric mixture to solidify; and removing said composite load bearing member from said cavity of said mold member.

7. The method of claim 6 wherein said plurality of suspension members comprise a polymeric material and are attached to said inner structural member.

8. The method of claim 6 wherein said plurality of suspension members comprise a plurality of retractable pin members extending into said cavity of said mold member.

9. The method of claim 6 wherein said block member comprises a polymeric material.

10. The method of claim 6 further comprising the step of hot stamping a textured pattern onto at least a portion of the surface of said composite load member after the composite load member has been ejected from the mold.

11. The method of claim 6 further comprising the step of opening said gate and wherein the step of removing the composite load bearing member from said cavity of said mold member is accomplished by removing the composite load bearing member through said opened gate.

* * * * *